United States Patent

[11] 3,576,326

| [72] | Inventors | Eugene R. Hafner;<br>Raymond A. Kern; William D. Shupe,<br>Indianapolis, Ind. |
|---|---|---|
| [21] | Appl. No. | 805,564 |
| [22] | Filed | Mar. 10, 1969 |
| [45] | Patented | Apr. 27, 1971 |
| [73] | Assignee | FMC Corporation<br>San Jose, Calif. |

[54] BEARING SEAL AND METHOD OF MAKING SAME
3 Claims, 2 Drawing Figs.

[52] U.S. Cl. ................................................... 277/1,
  277/95, 308/36.1
[51] Int. Cl. .................................................... F16j 15/02
[50] Field of Search ......................................... 308/132,
  238, 36.1; 277/95, 94, 1; 117/1, 97, 98

[56] References Cited
UNITED STATES PATENTS
2,979,779  4/1961  Staak ........................... 308/132

3,015,505  1/1962  Smith ........................... 277/95X
3,095,619  7/1963  Peterson ...................... 277/1

Primary Examiner—Laverne D. Geiger
Assistant Examiner—Robert I. Smith
Attorneys—F. W. Anderson and C. E. Tripp ABSTRACT: A foamed-in-place polyurethane cavity seal is provided to fill the cavity existing at the joint where a rotating auger is journaled in a flanged roller bearing unit. The relatively large diameter tubular outer auger shaft extends axially beyond the point at which an inner drive shaft of the auger enters the bearing unit, said outer tube being disposed around the bearing to substantially enclose it and define the cavity, which is to be filled by the subject polyurethane seal, between the bearing unit and the inner walls of the outer tube. The cavity seal is made by completely sealing off the cavity, pouring liquid polyurethane through an unplugged access hole in the auger tube, replugging the access hole and allowing the polyurethane to cure and expand within the cavity at room temperature.

INVENTORS
EUGENE R. HAFNER
RAYMOND A. KERN
WILLIAM D. SHUPE

BY F. W. Anderson
C. E. Tripp

ATTORNEYS

3,576,326

BEARING SEAL AND METHOD OF MAKING SAME

BACKGROUND OF THE INVENTION

1. Field of the Invention

The present invention relates generally to foamed-in-place expansible cavity seals but relates more particularly to an expansible polyurethane seal for filling the space adjacent or surrounding a bearing seal to prevent the entrance of foreign material at the joint where a dirt moving auger or the like is journaled for a bearing unit. The joint consists basically of a bearing such as a flanged cartridge block which receives and supports an inner drive shaft of a rotating member whose outer tube is secured to the drive shaft and extends axially beyond the point at which the shaft enters the bearing unit to substantially surround and enclose the bearing, leaving a cavity or space between the bearing and the inner walls of the outer tube. There is a small circumferential opening between the flange of the bearing housing and the surrounding tube to prevent metal-to-metal contact and misalignment between the rotating tube and the static bearing housing. In operation, the rotating member moves dirt or other materials on the outside surface of the tube so that most of the materials bypass the joint, but some of the materials pass through the circumferential opening between the relative rotating members and thereby enter the cavity between the bearing unit and the inner walls of the other member. The materials eventually become packed in this cavity forcing abrasive particles around the bearing seals and into the internal chambers of the bearing unit causing damage to the seals as well as the bearing unit itself. Experimentation has shown that no bearing seal is strong enough to withstand the force exerted thereon by the material packed in the cavity so to prevent damage to the bearing unit it is necessary to prevent the material from getting in a position to apply force on the bearing seals.

2. Description of the Prior Art

Expansible-in-place seals are disclosed in the Brinker et al. U.S. Pat. No. 2,012,951, Richter U.S. Pat. No. 2,151,410, and Peterson U.S. Pat. No. 3,095,619, patents each being made of different materials and functioning in different ways.

The Brinker et al. patent discloses an expansible seal made of finely ground vermiculite particles and mineral oil which is disposed between the cylinder walls, piston and rings of an internal combustion engine.

The Richter patent discloses a seal made of sponge rubber which has been soaked in molten wax, compressed, then allowed to cool while under compression. The seal is placed around a rotating axle which generates the heat necessary to melt the wax in the pad allowing the sponge rubber to expand and form a dust protective seal around the axle.

The Peterson patent discloses a sealing structure comprised of a rubber sealing member which is forced into a static seal with a mating member by an expanding in place puffable material confined beneath the rubber sealing member so that it can only expand in a direction to force the rubber member into contact with the mating member. In this patent the expanding material is not actually used as a seal itself but rather as a pressure exerting component of a rubber seal.

SUMMARY OF THE INVENTION

The polyurethane foam cavity seal of the present invention is adapted for use primarily where a flanged bearing unit is exposed in an internal cavity formed by the rotating outer tubular shaft of an auger which surrounds the bearing unit. Generally, the flanged bearing housing will be statically mounted on the frame of a machine utilizing the auger and situated so that an inner drive which is secured to the outer tubular shaft of the auger can be rotatably received within the bearing housing. The outer tubular shaft of the auger on which the helical blade of the auger is mounted extends axially beyond the point at which the inner drive shaft enters the bearing housing. One purpose for this extension is to protect the bearing unit and the drive shaft from undesirable elements situated exteriorly of the auger drum. It is necessary, however, that there be at least minimal clearance between the inner perimeter of the auger outer shaft and the outer perimeter of the flange of the bearing unit to provide for misalignment and to avoid metal-to-metal contact because the auger outer shaft rotates about the static bearing housing. This clearance unfortunately provides passage between the cavity within the walls of the outer tubular shaft and the external ambient environment, allowing undesirable elements to enter the cavity where upon compaction they can damage the bearing and prevent proper functioning of the auger. The polyurethane foam cavity seal of the present invention is adapted to form fit in the cavity to prevent the undesirable elements from entering the cavity. Inasmuch as some of the components of the bearing unit which are exposed to the cavity and thus the polyurethane seal are rotating and others are stationary, it is helpful but not necessary to coat one or both of the respective rotating and stationary surfaces of these components with appropriate compounds. Accordingly, the rotating surfaces within the cavity are coated with a parting compound and the stationary surfaces with a bonding or adhesive compound so that the seal will adhere to the stationary surfaces and remain stationary within the cavity with relatively no wear on the surfaces in contact with moving components. Of course, it would also be possible to apply the parting compound to the stationary surfaces and the bonding compound to the rotating surfaces if a reverse effect were desired. When the polyurethane seal is so situated in the cavity undesirable elements such as dirt and other abrasives are effectively prevented from entering the cavity and damaging the bearing unit.

Accordingly, it is an object of the present invention to protect a substantially enclosed bearing unit from undesirable elements.

Another object is to provide a seal which can take the shape of the internal cavity which it occupies.

Still another object is to provide a cavity seal which can be poured into the cavity in liquid form and expand to form fit the walls of the cavity in its final form.

Still another object is to provide a cavity seal which is adapted to be secured to certain static parts while permitting free movement of other adjacent moving parts.

Still another object is to provide a seal for the cavity existing between the journaled end of a rotating member and the bearing unit in which it is journaled that has adequate compressibility to allow for the misalignment of the members and yet cannot be damaged from the abrasive wear of materials that might work into the cavity.

Still another object is to provide a method of sealing the cavity between the journaled end of an auger and the bearing unit in which it is journaled.

The manner by which the advantages of the invention may be attained will be apparent from the accompanying drawings and a detailed description of the invention which follows.

DESCRIPTION OF THE PREFERRED EMBODIMENT

The seal of the present invention is described in connection with a road grading apparatus generally designated 10 in FIG. 1. It is not intended, however, that the invention be limited to such an apparatus, as the seal can be used wherever there is a cavity or space existing between two members that are in relative motion such as in screw conveyor bearings.

Figure 1:
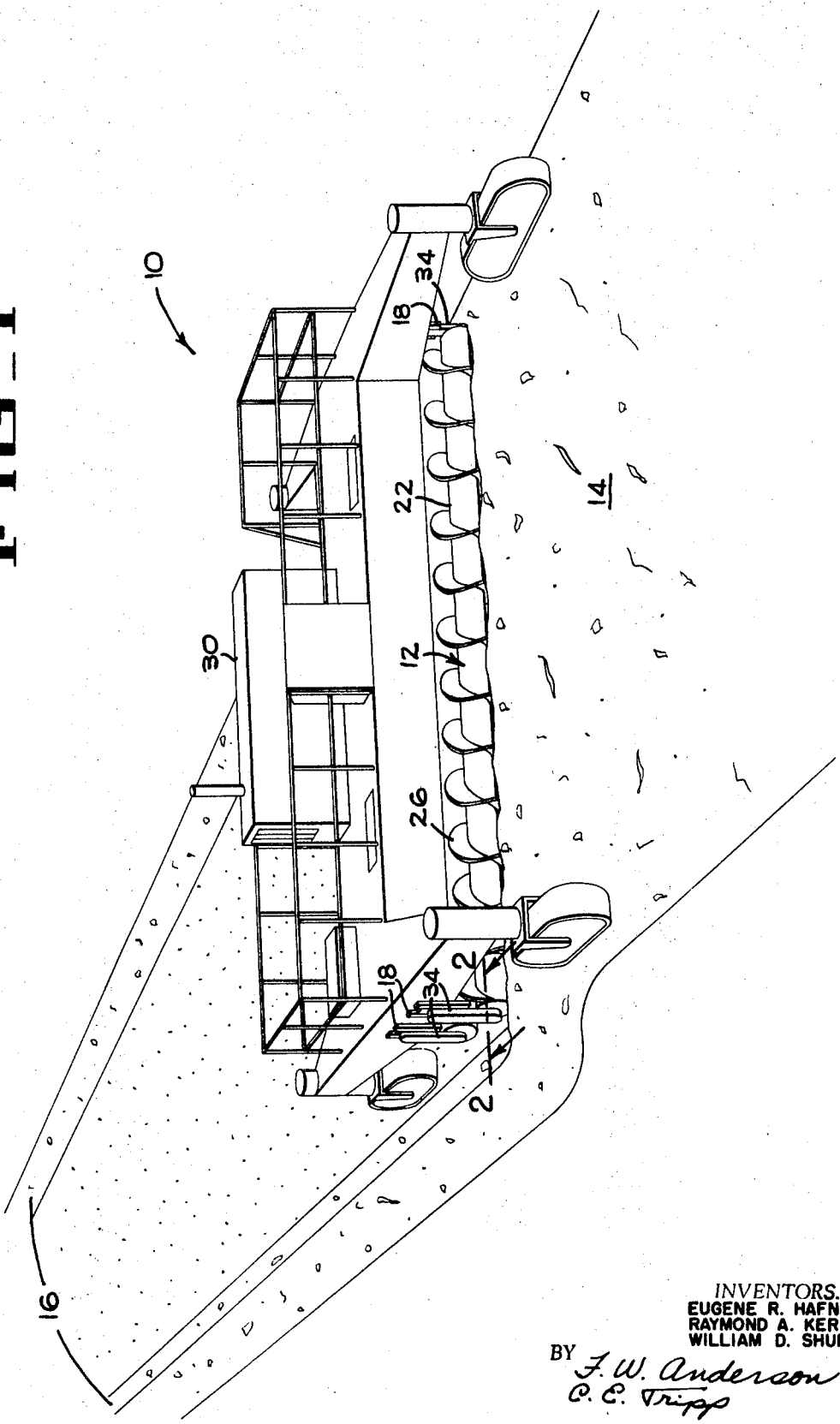
FIG. 1 is a perspective view of a road grading apparatus incorporating the cavity seal of the present invention.
Figure 2:
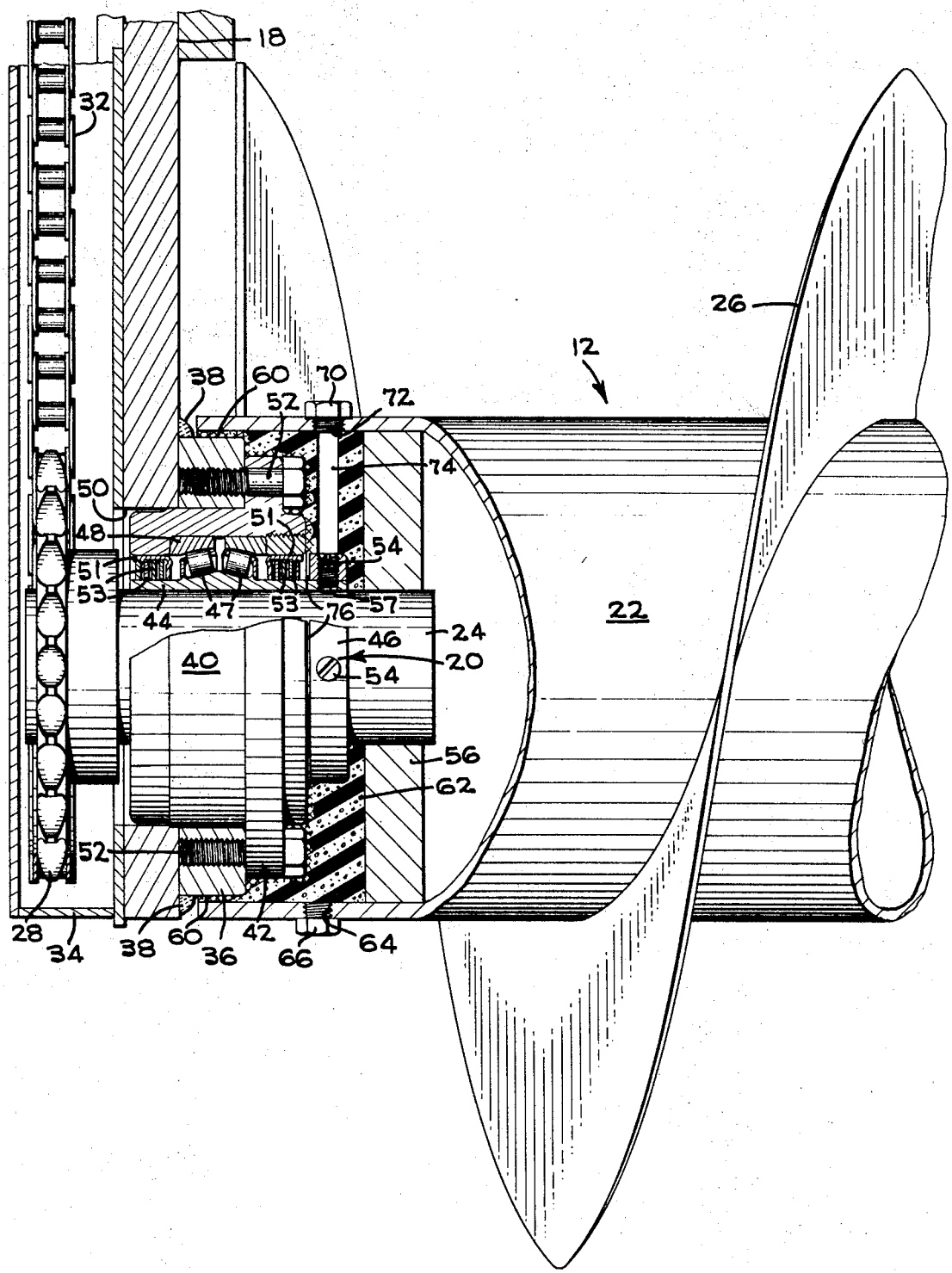
FIG. 2 is an enlarged sectional view taken on line 2–2 of FIG. 1 with parts broken away, showing the seal of the present invention in relationship to the auger and the bearing unit in which the auger is journaled.

Referring to FIG. 1, the grading apparatus has two identical augers 12, one of which is hidden from view, extending transversely the entire width of the apparatus for trimming the road bed and transferring excess dirt, gravel, or other randomly oriented matter 14 to the sides of the apparatus where it is neatly piled in two longitudinal rows 16. Disposed on either side of the autograde apparatus are frame members 18 in which bearing units 20, one of which is shown in FIG. 2, are mounted to receive the shafts of the augers 12.

A detailed description of the cavity seal of the present invention will be made with reference to only one end of one of the augers 12 as the other ends are mounted in a substantially identical manner. Referring to FIG. 2 where one of these mounted ends is illustrated, it can be seen that auger 12 comprises an outer tubular shaft or drum 22, an inner drive shaft in the form of a stub shaft 24, and an helical blade 26 for physically moving the dirt 14. The drive shaft 24 extends axially through the bearing unit 20 and is operatively secured to a drive sprocket 28. Sprocket 28 is rotated by motor means 30 (FIG. 1) via link chain 32 which is completely enclosed by a chain guard 34 for safe and efficient operation. A retainer ring 36 for receiving a flanged housing 40 of bearing unit 20 is circumferentially welded to the frame 18 at 38. The body of flanged bearing housing 40 fits snugly into and extends through the center opening of the retainer ring 36 and into a circular opening 50 in frame 18. The bearing housing 40 is provided with an annular flange portion 42 of greater diameter than the body of the housing which annularly abuts one face of retainer ring 36. Four bolts 52, two of which are not shown, are inserted through apertures in the annular flange 42 to secure the bearing housing to retainer ring 36 and thus to the frame 18. A cylindrical inner race member 44 of bearing unit 20 is rotatably mounted within the bearing housing and has a cylindrical passage through its axial center to tightly receive the auger drive shaft 24.

A collar member 46 of bearing unit 20 serves to secure inner race 44 to shaft 24 and also to substantially seal off the inner portions of housing 40. Setscrews 54 threadedly pass through collar 46, an aperture 57 in inner race 44, and are disposed in abutting relationship with the outer surface of shaft 24 to secure the collar and inner race member to shaft 24 for unitary rotation.

Within bearing housing 40 are roller bearings 47 to provide a substantially frictionless rotational relationship between the inner race 44 and the outer race 48 which is mounted within the bearing housing. Annular labyrinth seals 51 having several floating rings 53 therewithin, serve to protect the roller bearings 47 and the raceways from entry of adverse elements located exteriorly of the housing.

Referring now to the outer tubular auger shaft 22, it can be seen that it extends axially beyond the point at which the drive shaft 24 enters the bearing unit and lies in partially overlapping relationship with retainer ring 36. The inner diameter of the auger shaft 22 is slightly larger than the outer diameter of retainer ring 36, leaving an annular overlap passageway 60 into the cavity defined by the circular inner wall 56 of the auger, the cylindrical inner wall of the auger shaft 22 and the exposed faces of the bearing unit. It is within this cavity that the seal 62 of the present invention is inserted.

The cavity seal 62 is made of an expansible polyurethane foam and it form fits all the surfaces which are exposed to the cavity. Polyurethane is desirable for the seal material because it can be made to have a compressibility sufficient to allow for a misalignment within the capacity of the design of the auger shaft or the bearing housing, and yet is not damaged from the abrasive wear given it by dirt which tends to work around it through passageway 60. Another desirable quality of polyurethane foam, as a seal, is that it can be poured into the cavity in liquid form where it will expand to take the shape of the cavity.

To make the polyurethane seal 62, plugs 70 (FIG. 2) are removed from the auger shaft 22 leaving the holes 72 open. The second plug 70 and hole 72 are located above the second setscrew 54 and therefore are not seen because they are removed from the sectional view of FIG. 2. After removal of the plugs 70, setscrews 54 are removed so that long capscrews can be inserted through the holes 72 and into the setscrew holes to provide setscrew access channels 74 through the foam seal after it is complete. The auger tube overlap passageway 60 is next sealed to prevent loss of the sealing material when the cavity is filled. The static surfaces of the bearing housing 40 and retainer ring 36 which are exposed to the cavity and indicated by $x$'s in FIG. 2, preferably are coated with a bonding or adhesive compound so that the foam seal in its final form will adhere to these surfaces to prevent the seal from rotating with shaft 24 and bearing collar 46. The surfaces of the rotating collar 46, inner drive shaft 24, and auger inner wall 56, that are exposed to the cavity, preferably are coated with a parting compound, such as silicone grease or some other suitable substance, to reduce friction between these rotating surfaces and the foam seal and to prevent bonding. Finally, plug 66 is removed and polyurethane in its liquid form is poured into the cavity through inspection hole 64. An example of a desirable filler material would be a commercial product known by its trade name as Nopcofoam F-506. This material is a flexible polyurethane foam with a free-foaming density of 4—5pounds per cubic foot. Twice as much of the foam material needed to free-fill the cavity should be poured into the cavity to increase the foamed density for better wear resistance. Immediately after filling, plug 66 should be reinserted to close the cavity, and the polyurethane foam should be allowed to expand by curing at room temperature.

After curing, the long setscrews can be removed, original setscrews 54 replaced, and holes 74 replugged with bolts 70. The temporary seal of passageway 60 is next removed leaving the polyurethane seal 62 ready for operable use.

Prior to the present invention, due to the large volume of dirt transferred across the outer face of auger drum 22, dirt would work its way through overlap passageway 60 and into the cavity which can now be filled with the cavity seal of the present invention. After continued operation of the auger, the dirt would become compacted within the cavity forcing some of the abrasive dirt particles within the cavity through annular gap 76 between the bearing collar 46 and the adjacent face of the bearing housing. Once through this gap, the dirt would work its way around and between the rings 53 of the bearing seal 51, damaging the seal 51 and reducing its effectiveness. When the bearing seal became damaged, dirt would get into the internal chambers of the bearing housing, causing abrasive damage to the inner and outer raceways of the roller or ball bearings.

The polyurethane cavity seal of the present invention effectively prevents the entry of dirt and other undesirable elements into the cavity between the relative rotating members and in so doing tremendously increases the useful life of the bearing unit and decreases maintenance of the machine.

Although the best mode contemplated for carrying out the present invention has been herein shown and described, it will be apparent that modification and variation may be made without departing from what is regarded to be the subject matter of the invention.

We claim:

1. An improved joint for preventing entrance of foreign material comprising in combination a first stationary member, a second movable member in mating relationship with said first member, said members having a cavity therebetween, a bonding compound on one of said members, a parting compound on the other of said members, and an expansible-in-place polyurethane seal to close said cavity, said seal form fitting the inner surfaces of said cavity.

2. The method of making a seal to fill the open cavity between a first stationary member and a surrounding movable second member comprising the steps of coating the stationary surfaces within the said cavity with an adhesive compound, coating the movable surfaces within the said cavity with a parting compound, pouring liquid polyurethane into the said cavity, closing the cavity, and curing the polyurethane to let it expand within the said cavity.

3. The method of making a seal to fill an open cavity between a first member and a relatively movable second member leaving a channel through the seal comprising the steps of inserting an elongated member into said cavity, pouring liquid polyurethane into the said cavity and around said elongated member, closing the cavity, curing the polyurethane to let it expand within the cavity, and removing the elongated member after the polyurethane has cured.